Nov. 18, 1924.  
G. S. ADAMS  
1,516,318
RESILIENT VEHICLE TIRE
Filed June 30 1921
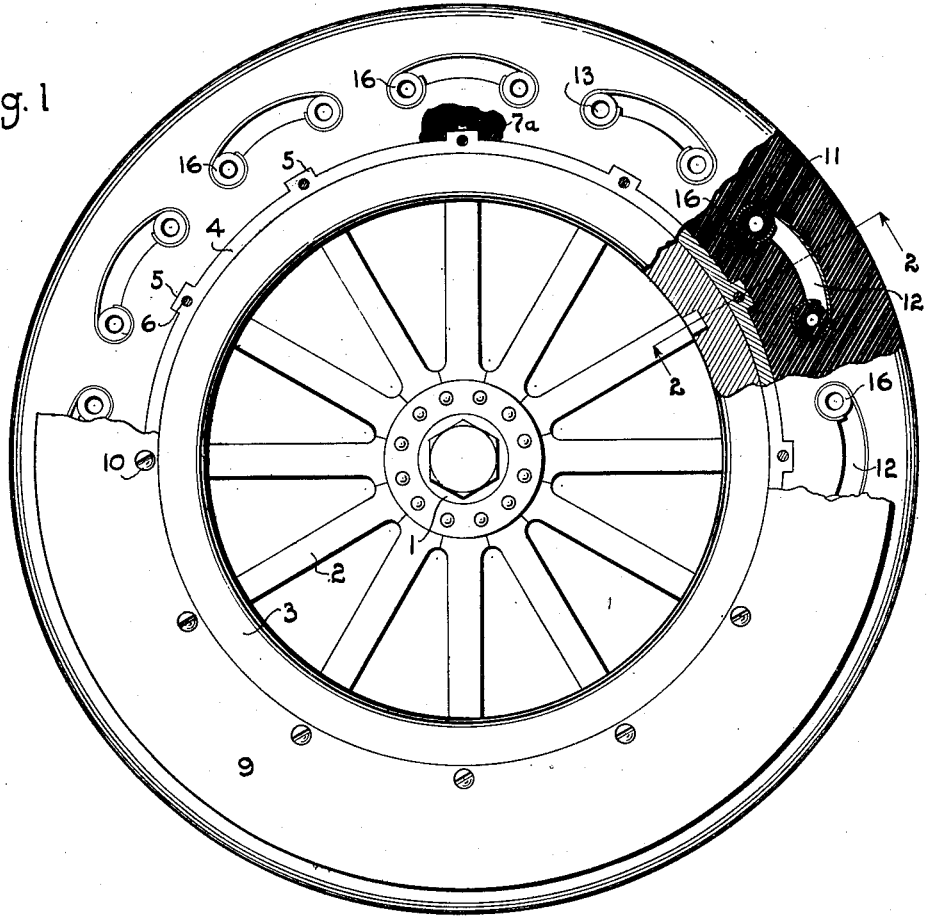
Fig. 1
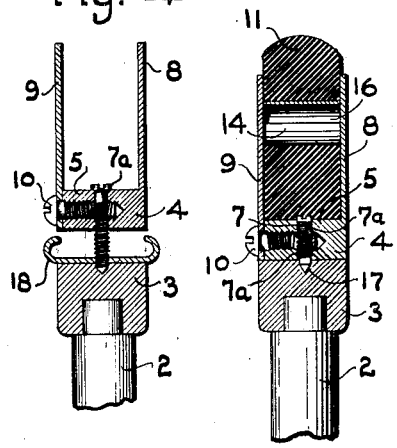
Fig. 4
Fig. 2
Fig. 3
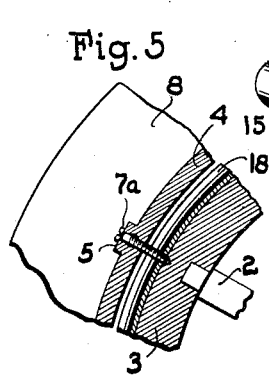
Fig. 5
WITNESSES
Gideon S. Adams
INVENTOR
BY
ATTORNEY Patented Nov. 18, 1924.

1,516,318

UNITED STATES PATENT OFFICE.

GIDEON S. ADAMS, OF PALERMO, NEW JERSEY.

RESILIENT VEHICLE TIRE.

Application filed June 30, 1921. Serial No. 481,726.

*To all whom it may concern:*

Be it known that I, GIDEON S. ADAMS, a citizen of the United States, residing at Palermo, in the county of Cape May and State of New Jersey, have invented a new and useful Resilient Vehicle Tire, of which the following is a specification.

This invention has reference to resilient vehicle tires and is an improvement upon the resilient tire for which I obtained Letters Patent No. 1,022,220, on April 2, 1912. The invention comprises a vehicle wheel having a felly or rim on which is lodged a ring, which may be of metal, with peripheral ribs each having a transverse threaded passage for the reception of a fastening screw, and these ribs are also each threaded radially for the passage of a set screw to enter sufficiently into the rim and felly to anchor the ring against movement thereon.

The resilient tire, like that shown in the Letters Patent, is provided with peripherally curved sockets in the form of slots extending circumferentially of the tire, but on a shorter radius than the curvature of the tire, and each terminating in an enlargement, so that a flat spring may be lodged in the slot and in the curved terminal portion thereof, and, moreover, the curved terminal portion or eye is shaped to receive an eye-end of the spring, which eye-end encloses a resilient tube preventing collapse of the eye-end of the spring but contributes to the elasticity thereof.

The invention will be best understood from a consideration of the following detailed description, taken in connection with the accompanying drawing, with the understanding, however, that the invention is not confined to any strict conformity with the showing of the drawing, but may be changed and modified, so long as such changes and modifications mark no material departure from the salient features of the invention as expressed in the appended claim.

In the drawings:

Fig. 1 is an elevation, partly broken away and partly in section, of a vehicle wheel constructed in accordance with the invention.

Fig. 2 is a section on the line 2—2 of Fig. 1.

Figure 3 is a perspective view of one of the spring elements.

Fig. 4 is a similar view to that of Fig. 2 but showing a modification.

Fig. 5 is a circumferential section of a portion of the structure shown in Fig. 4.

Referring to the drawing, and particularly to Figs. 1, 2 and 3, there is shown a vehicle wheel comprising a hub 1, spokes 2, and felly 3, all of which may be, in general, of usual construction.

Applied about the felly 3, is a ring 4 which may be a metallic ring, and at intervals, this ring is provided with peripheral radial ribs 5, suitably spaced apart, which spacing may be, though is not necessarily, the same as that of the spokes. Each rib 5 has a laterally disposed threaded opening 6, and another opening 7, also threaded and radial of the ring for a screw $7^a$. The ring 4 is provided with a face plate 8 at one side edge projecting radially to form one face of a channel, with the other face of the channel comprising another face plate 9 held to the opposite edge of the ring 4 by screws 10, adapted to the screw holes 6. In the space between the face plates 8 and 9, of which the plate 8 is fixed and the plate 9 is removable, a rubber tire 11 is lodged, such tire being endless and of the cushion type.

Besides the resiliency imparted to the tire 11 by the material of which it is composed that is, rubber, the tire 11 is provided with a circular series of slots 12, which may be located about midway between the outer and inner peripheries of the tire, and which extend from one face plate to the other. The slots 12 are each curved on an arc of shorter radius than that of the curvature of the tire as a whole, which arcs may be, though are not necessarily struck on centers falling within the felly 3. The terminal portions of the slots 12 are enlarged as shown at 13 and the enlargements are offset inwardly. Each slot is occupied by a leaf spring 14 with a circularly-curved or coiled terminal 15 at each end incompletely filling the enlargement 13, and within each curved portion 15 there is lodged a tube 16 of resilient material, such as rubber.

When the tire is assembled, the ring 4 is applied about the felly 3 and the screws $7^a$ are screwed through the ring until the inner ends 17 thereof, which may be pointed, or otherwise formed, enter a short distance into the felly, thus locating the ring on the felly and preventing it from creeping in any direction. The screws $7^a$ are made sufficiently long to project a short distance beyond the outer face of the ring and may there be furnished with screw driver slots or with squared or other ends for the application of a suitable turning tool. Of course, the manipulating ends of the screws 7ª may be countersunk with reference to the ring and particularly with reference to the ribs 5, but in either event the tire 11 is provided with transverse grooves to accommodate the ribs 5.

The face plate 9, when applied to the ring 4, is held thereto by the screws 10 or in other appropriate manner, and this plate imprisons the springs 14 with the ends 15 and the rubber tubes 16 in the grooves or passages 12 and their enlargement 13.

When the wheel is in use, the weight is borne primarily by the rubber tire reinforced by the springs 14 and by the tubular terminal members 16 of rubber, this latter feature preventing collapse of the coils 15 and preventing bending of such coils 15 to an extent which would either break or set the coils 15.

The side plates 8 and 9 of the channels confining the rubber tire are made sufficiently rigid to withstand the strains to which the tire is put and the plates stop short of the outer edge or periphery of the tire by a distance permitting wear of the tire without exposing the springs 14. The diametric thickness of the tire is ample to provide elasticity or resiliency enough for the load carried by the tire.

The slots 12 are spaced apart at their ends, as considered circumferentially, by a distance sufficient to provide solid rubber portions imparting elastic resistance to the tire between the slots.

In the construction shown in Figs. 4 and 5, the body of the wheel is indicated by the spokes 2 and felly 3 as in the other figures and on the felly is secured the usual channel rim 18 such as is used to hold a casing of the clincher type, showing the application of the invention to a wheel of such type to replace a clincher tire.

In the construction shown in Figs. 4 and 5 there is a ring 4 surrounding the rim 18 and anchored thereto at intervals by screws 7ª extending through the rim 18, and, if need be, into the felly 3, these screws also serving as spacers to center the ring 4. The plates 8 and 9 and the screws 10 are the same as in Figs. 1 and 2, and it is to be understood that the rubber tire 11 is to be used in Figs. 4 and 5.

What is claimed is:—

The combination of a substantially solid elastic tire having a circular series of curved longitudinal slots spaced apart at their ends, with leaf spring reinforcements therein, having each end terminating in a coil, and a tubular member of elastic material in each coil constituting a collapse-resistant reinforcement for the coil.

In testimony, that I claim the foregoing as my own, I have hereto affixed my signature.

GIDEON S. ADAMS.